United States Patent Office 3,478,125
Patented Nov. 11, 1969

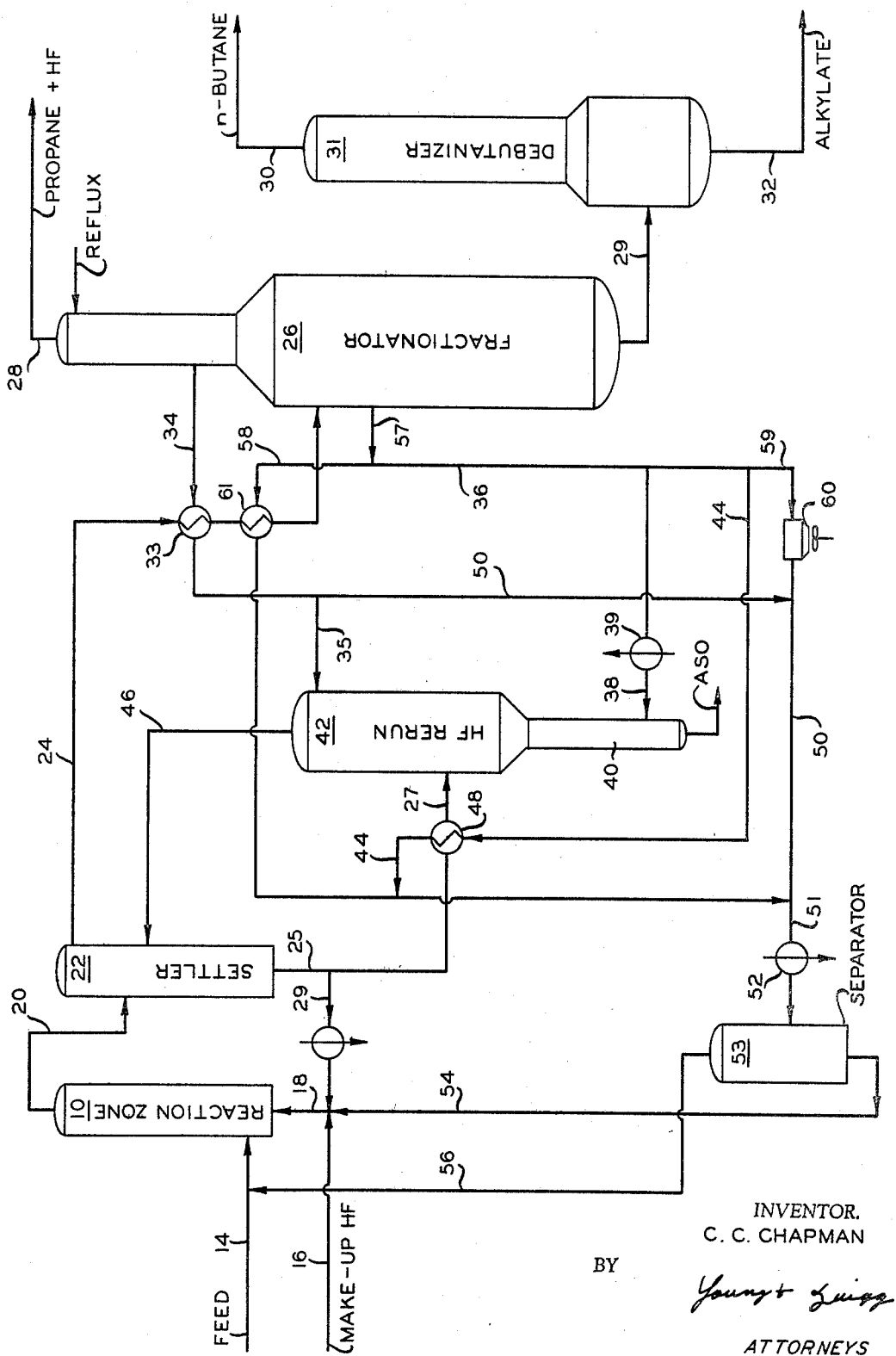

3,478,125
HF ALKYLATION ACID RERUN SYSTEM
Charles C. Chapman, Bartlesville, Okla., assignor to Phillips Petroleum Company, a corporation of Delaware
Filed May 22, 1967, Ser. No. 640,172
Int. Cl. C07c *3/52, 3/54*
U.S. Cl. 260—683.48                 6 Claims

ABSTRACT OF THE DISCLOSURE

In an HF alkylation system comprising a reaction zone, a settling zone, an acid rerun column, and a fractionation zone, isoparaffin is taken off the fractionation zone in two streams, a liquid stream and a vapor stream. This vapor stream is used to indirectly heat a portion of HF mixture from the settling zone prior to introduction into the HF rerun column; the isoparaffin from this heat exchange is added to the liquid stream, this combined stream is cooled, and HF present is separated from the hydrocarbon phase, the HF and isobutane then being returned separately to the reaction zone. A second portion of the vapor stream is introduced into the lower portion of the acid rerun column to act as a stripping medium.

---

This invention relates to improvements in a hydrogen fluoride catalyzed alkylation system.

Hydrogen fluoride, that is hydrofluoric acid, is widely used as a catalyst in the alkalation of low boiling paraffinic hydrocarbons, particularly isobutane and/or isopentane with alkylating reagents, particularly low-boiling olefins such as propylene, various butylenes, and/or various amylenes to form normally liquid paraffins having high octane numbers. The reaction is carried out by introducing a suitable amount of make-up and/or regenerated hydrofluoric acid, which with recycled acid, provides a hydrocarbon to acid catalyst ratio of about 1:1 to 10:1 on a liquid volume basis. This mixture is intimately admixed in a reaction zone and the resulting mixture passed to a settling zone wherein a phase separation between the less dense liquid hydrocarbon phase and the more dense liquid hydrofluoric acid phase is readily obtained. The hydrofluoric acid phase is withdrawn from the settling zone and most of it returned or recycled to the alkylation zone. A small portion, generally within the range of about 1 to about 10 percent by volume, of the acid phase is passed to an acid separation tower (HF rerun column) for purification. This acid phase contains—in addition to the HF to be recovered—water, a high-boiling organic material generally referred to as HF-acid soluble oil or just "oil," and minor amounts of other impurities.

The portion of liquid acid passed to the HF rerun column is heated prior to its introduction into the rerun column so as to at least partially vaporize the acid and to aid in stripping the acid from the impurities. Conventionally this has been done by means of a steam heated indirect heat exchanger. This method of heating has certain undesirable features. For one thing it requires the input of extraneous heat into the overall system at the same time heat is being removed from other parts of the alkylation system. Moreover, such heat exchangers tend to corrode, apparently due to the high skin temperatures. Yet leaks cannot be tolerated in an exchanger such as this with steam (water) on one side and HF acid on the other, since HF becomes highly corrosive in the presence of water while present in the liquid phase.

A portion of isobutane from the fractionation zone is conventionally introduced into the HF rerun column to serve as a stripping medium. It is the usual practice in such an operation to take a liquid isobutane stream from an overhead accumulator used on the top of a tower in the fractionation system, reheat it to stripping temperature and introduce it into the lower portion of the rerun column. It is apparent that this comes short of an ideal setup so far as economics is concerned since the isobutane vapors in the tower are first condensed and withdrawn as a liquid and then reheated. One reason vapor streams have not generally been utilized to provide stripping and reboiling media is that there is a higher concentration of HF in the hydrocarbon vapor of a fractionation tower than is present in the liquid when removed from the column above the feed input tray. By use of isobutane vapor stream removed from below the feed tray, less HF is present than in vapor removed from above the feed tray. This is of significance because if small amounts of HF are present in the isobutane recycle to the reaction zone when contacted with olefins (in the absence of excess HF acid catalyst) a poorer quality alkylate results. This is not a problem so far as stripping vapors used in the rerun column are concerned since they are returned to the settling zone rather than to the reaction zone without directly contacting an olefin; and indeed it is occasionally the practice in the prior art to take a vapor stream from a fractionation tower to provide a stripping medium. It is apparent, however, that it would be desirable to return any isobutane used as a heat exchange medium to the reaction zone as a part of the recycle since it is already at least partially cooled.

It is an object of this invention to provide a process and apparatus for heating the HF mixture being fed into an HF rerun column with a minimum introduction of additional or extraneous heat into the overall alkylation system.

It is a further object of this invention to provide a process and apparatus for the heating of HF mixture being fed into an HF rerun column without the use of steam and the resulting problems of corrosion and leakage.

It is a still further object of this invention to provide a process and apparatus for utilizing vapors from a fractionation tower of an alkylation unit to heat the HF mixture being fed into an HF rerun column and to serve as a stripping medium for said column.

It is yet a further object of this invention to provide a process and apparatus whereby liquid isobutane (lean in HF) from the fractionation zone of an HF alkylation unit can be taken off and used for recycle and vaporous isobutane (lean in HF) can be taken off from below the feed tray and used for reboiling and stripping.

In accordance with this invention, an isobutane liquid stream from above the feed tray and an isobutane vapor stream from below the feed tray are withdrawn from a fractionation zone in separate streams. The vapor stream is divided into at least two substreams, a first substream being fed to an indirect heat exchanger to heat a portion of HF mixture from a settling zone prior to the introduction of this HF into a rerun column. This now partially cooled first substream is then combined with the liquid stream, passed through a separator to remove HF, and said isobutane and the separated HF recycled via separate streams to the reaction zone. The second substream which is relatively hot is fed to the lower portion of the rerun column to serve as a heating and stripping medium; this second substream is taken off the top of the rerun column carrying with it purified HF.

The drawing, forming a part hereof, is a diagrammatic flow plan of an alkylation unit including an HF rerun system.

Referring now to this drawing, feed comprising isobutane and olefin is introduced into the reaction zone 10 via conduit 14. Make-up HF from conduit 16 can be fed into the reaction zone via conduit 18. The effluent from the reaction zone passes via conduit 20 to settling zone 22. The hydrocarbon phase is withdrawn from the upper portion of zone 22 via conduit 24 and passes to fractionation tower 26. The acid phase is removed from the lower portion of zone 22 via conduit 25. Propane is taken off said fractionation tower via conduit 28 and alkylate containing normal butane is removed via conduit 29 and passed to debutanizer 31. Normal butane is removed from said debutanizer via conduit 30 and alkylate recovered via conduit 32. Liquid isobutane is removed from fractionator 26 via conduit 34 and passed through fractionator feed-to-recycle heat exchanger 33 wherein it is cooled while heating the fractionator feed carried by conduit 24. A portion of cooled liquid isobutane is passed via conduit 35 to reflux rerun column 42. Isobutane vapors are removed via conduit 57 which splits into conduit 36 and conduit 58. Conduit 36 splits into conduits 38 and 44. In the fractionation zone of the drawing, liquid isobutane is withdrawn from a tray above the feed to the fractionator and isobutane vapor is withdrawn from the vapor space above a tray located below the feed to the fractionator. A portion of the hot isobutane vapor is introduced into the leg 40 of HF rerun column 42 via conduit 38; heater 39 in conduit 38 brings this isobutane vapor to the desired final temperature; this vapor supplies a portion of the heat required and also is a stripping medium to aid in separating The HF from impurities. After traveling up the column, these hot isobutane vapors, carrying purified HF, pass out the upper portion of the rerun column through conduit 46 and thence back to settling zone 22. Conduit 25 divides into conduit 27 which introduces a small portion of the relatively cool system HF acid into the rerun column, and conduit 29 which returns the rest of the acid to the reaction zone. The remaining portion of the hot isobutane vapor is carried by conduit 44 through indirect heat exchanger 48. The thusly cooled isobutane is withdrawn from heat exchanger 48 via conduit 44 and combined with the isobutane stream carried by conduit 58. The combined liquid isobutane recycle from conduit 50 and the cooled isobutane from heat exchangers 48 and 61 are fed via conduit 51 to recycle cooler 52 and thence to recycle separator 53 to remove HF. The separated liquid HF is returned to the reaction zone via conduit 54. The separated liquid isoparaffin, substantially free of HF is returned to the reaction zone via conduit 56 which connects with the fresh feed conduit 14.

More vapors can be taken off via conduit 57 than are needed to strip HF rerun column 42 and to heat system HF carried by conduit 27. In this case a portion of these vapors can be passed via conduit 58 through second feed heat exchanger 61 to the combined stream carried by conduit 51. A further portion of these vapors can be pulled off from conduit 44 via conduit 59 and passed through air fin cooler 60, and thence returned to conduit 50.

The recycle cooler 52 serves to separate out HF present in the recycle isobutane. While there is generally a small amount of HF in the liquid recycle isobutane, operation in accordance with the instant invention decreases the amount of HF because there is a lower concentration of HF in the isobutane vapor withdrawn from the fractionation tower below the feed trap (HF is removed along with propane via conduit 28 to further processing) than there is in the isobutane liquid. The solubility of HF in liquid isobutane decreases with a decrease in temperature. The liquid isobutane withdrawn from fractionation zone 26 via conduit 34 is saturated with HF. Upon further cooling of this stream, HF liquid separates, leaving a cooled isobutane liquid, which although saturated with HF, has considerably less HF dissolved therein. In the event of leaks in the heat exchanger for the acid feed to the rerun column—while there is no corrosion problem as is the case when a steam heater is used—some HF can diffuse into the recycle isobutane stream. It is essential that the HF be separated from the isobutane and introduced back into the reaction zone separately from the isobutane. This is because if the olefin or olefins come in contact with the HF acid in the presence of isobutane under alkylation conditions but where the acid concentration is low, a poorer quality alkylate will result. Thus, the olefin-isobutane must contact the acid only under conditions where the acid concentration is relatively high. For this reason HF in the recycle isobutane should be separated from the isobutane and introduced into the reactor along with the other HF acid, or at least in some manner where there is no contact of olefin-isobutane at a low concentration of HF acid.

It is apparent that the drawing is somewhat simplified in that many parts such as valves, pumps, heaters, coolers, and other conventional equipment are not shown. However, their inclusion is understood by those skilled in the art and is within the scope of the invention.

The novel HF rerun system of the instant invention has been described in the drawing in use in an alkylation unit utilizing an isobutane feed. While it is of utility in any HF catalyzed alkylation unit, for instance one utilizing an isopentane feed, isobutane is the feed normally employed in current commercial practice. If a different feed were used, then, of course, the stripping vapors and the like would be different compounds. Mixed feeds, of course, can be used. In the preferred embodiment the fractionation zone comprises a single fractionation tower and the vapors are withdrawn from the fractionation tower at a point below the feed to the tower, the liquid being withdrawn from the upper portion of this tower. It is also within the scope of this invention to use a fractionation zone comprising a series of towers, which are well known in the art, in place of the single tower.

The stripping vapor is preferably added to the lower portion of the rerun column by means of a lance or sparge to insure better distribution of the stripping medium.

While in the preferred embodiment the stripping vapor carrying the HF from the top of the rerun column is added to the settling zone, it is also possible to add the HF directly back into the reaction zone.

Sieve trays may be provided in the rerun column just below the point where the heated HF acid is introduced. In this way the liquid portion of the spent catalyst is distributed over a greater area to facilitate better heat transfer and increased stripping of the HF from the spent catalyst.

The reaction zone can comprise any alkylation reactor known in the art. A preferred type is a simple pipe or conduit reactor.

The settling zone can comprise any type of vessel known in the art for achieving phase separation.

The portion of the isobutane vapors from the fractionation tower which are used to strip the HF acid in the rerun column are preferably fed back into the settling zone. Thus, this isobutane plays no part in maintaining a proper isobutane/olefin ratio in the reaction zone. The portion of the isobutane vapors which are used to heat exchange the acid, however, are returned to the reaction zone via conduits 51 and 56 and thus does form a part of the isobutane needed to maintain the proper ratio of isobutane to olefin in the reaction zone.

Example

Isobutane is alkylated with propylene and butylenes using an HF catalyst in a system such as is shown in the drawing. The hydrocarbon to acid volume ratio in the reactor is 4:1. The isobutane to olefin mole ratio in the reactor is 12:1. The operating conditions are as set out in Table I. The flow balance in pound moles per hour is shown in Table II.

vapor stream is withdrawn from said fractionation zone at a point below the feed to said fractionation zone.

TABLE I

| Operation Conditions | Stream | | | | | HF Rerun Column | Reaction Zone (10) | Settler Zone (22) |
|---|---|---|---|---|---|---|---|---|
| | (34) | (36) | (44) | (56) | (54) | | | |
| Temperature, °F | 183 | 210 | {210 in / 140 out} | 80 | 80 | {Top, 190 / Bottom, 300} | {84 in / 90 out} | 90 |
| Pressure, p.s.i.g | | | | | | 130 | 120 | 100 |

TABLE II

| | Fresh Feed | Recycle | | Reactor Effluent | Propane Plus HF | Normal Butane | Alkyl-ate | Liquid Isobutane | | Vaporous Isobutane | | | | | |
|---|---|---|---|---|---|---|---|---|---|---|---|---|---|---|---|
| | | HF | Iso-butane | | | | | | | | | | | | |
| Stream No | (14) | (54) | (56) | (24) | (28) | (30) | (32) | (34) | (50) | (57) | (58) | (36) | (59) | (44) | (51) |
| Component: | | | | | | | | | | | | | | | |
| Propane | 27.3 | | 40.2 | | 28.3 | | | 39 | 38.2 | 2 | .5 | 1.5 | 1.3 | .2 | 40.2 |
| Propylene | 6.5 | | | | | | | | | | | | | | |
| Butylenes | 396.4 | | | | | | | | | | | | | | |
| Isobutane | 418.2 | | 3,926.9 | 3,962.4 | .4 | 6.0 | | 704 | 689.8 | 3,252 | 848.4 | 2,403.6 | 2,126.5 | 262.2 | 3,926.9 |
| Normal Butane | 212.0 | | 1,044.6 | 1,256.6 | | 188.0 | 24 | 175 | 171.5 | 877 | 228.9 | 648.1 | 573.5 | 70.7 | 1,044.6 |
| Total Alkylate | | | 62.6 | 523.0 | | 5.0 | 455 | 9 | 8.8 | 54 | 14.1 | 39.9 | 35.3 | 4.4 | 62.6 |
| HF | | 34.5 | 14.0 | 177.0 | 128 | | | 18 | 17.6 | 31 | 8.1 | 22.9 | 20.3 | 2.5 | 48.5 |
| Total | 1,060.4 | 34.5 | 5,088.3 | 5,919.0 | 156.7 | 199.0 | 479 | 945 | 926 | 4,216 | 1,100 | 3,116 | 2,757 | 340 | 5,122.8 |

While this invention has been described in detail for the purpose of illustration, it is not to be construed as limited thereby but is intended to cover all changes and modifications within the scope thereof.

I claim:

1. In an alkylation process wherein olefin, an isoparaffin, and HF catalyst are contacted under reaction conditions in a reaction zone, effluent from said reaction zone is passed to a settling zone, a hydrocarbon phase containing a small amount of HF is withdrawn from the upper portion of said settling zone and introduced into a fractionation zone, an acid phase is withdrawn from the lower portion of said settling zone and wherein at least a portion of said acid phase is introduced into an acid rerun column, the improvement comprising: withdrawing isoparaffin from said fractionation zone in separate liquid and vapor streams; passing a first portion of said vapor stream into the leg of said acid rerun column to act as a stripping medium; passing a second portion of said vapor stream to an indirect heat exchanger to heat said acid prior to its introduction into said acid rerun column; thereafter combining said second portion with said liquid stream from said fractionator; separating the HF and isoparaffin in said combined stream; and returning said HF and said isoparaffin to said reaction zone through separate inlets.

2. The method according to claim 1 wherein said isoparaffin is isobutane.

3. The method according to claim 1 wherein said

4. The method according to claim 1 wherein stripping vapors carrying HF are withdrawn from the upper portion of said rerun column and returned to said settling zone.

5. The method according to claim 4 wherein said liquid stream is heat exchanged with said hydrocarbon phase being introduced into said fractionation zone; wherein a third portion of said vapor stream is heat exchanged with said hydrocarbon phase being introduced into said fractionation zone, and thereafter said third portion is combined with said second portion of said vapor stream; and wherein a portion of the vapor from said second portion is cooled and introduced directly into said liquid stream.

6. The method according to claim 4 wherein said liquid stream is heat exchanged with said hydrocarbon phase being introduced into said fractionation zone; wherein a third portion of said vapor stream is heat exchanged with said hydrocarbon phase being introduced into said fractionation zone, and thereafter said third portion is combined with said second portion of said vapor stream.

References Cited

UNITED STATES PATENTS 2,379,368   6/1945   Matuszak _____ 260—683.48
3,171,865   3/1965   Davison et al. ____ 260—683.48

DELBERT E. GANTZ, Primary Examiner

G. J. CRASANAKIS, Assistant Examiner

UNITED STATES PATENT OFFICE
CERTIFICATE OF CORRECTION

Patent No. 3,478,125                          November 11, 1969

Charles C. Chapman

It is certified that error appears in the above identified patent and that said Letters Patent are hereby corrected as shown below:

Column 6, lines 1 and 2 should be moved between lines 57 and 58 of column 5 so as to complete claim 3.

Signed and sealed this 24th day of February 1970.

(SEAL)
Attest:

Edward M. Fletcher, Jr.                    WILLIAM E. SCHUYLER, JR.
Attesting Officer                            Commissioner of Patents